United States Patent
Johnson et al.

(10) Patent No.: US 9,811,924 B2
(45) Date of Patent: Nov. 7, 2017

(54) INTERFEROMETRIC TECHNIQUES FOR MAGNETIC RESONANCE IMAGING

(75) Inventors: Kenneth O. Johnson, Fremont, CA (US); Craig H. Meyer, Charlottesville, VA (US)

(73) Assignee: University of Virginia Patent Foundation, Charlottesville, VA (US)

(*) Notice: Subject to any disclaimer, the term of this patent is extended or adjusted under 35 U.S.C. 154(b) by 95 days.

(21) Appl. No.: 14/112,737

(22) PCT Filed: Apr. 19, 2012

(86) PCT No.: PCT/US2012/034305
§ 371 (c)(1),
(2), (4) Date: Oct. 18, 2013

(87) PCT Pub. No.: WO2012/145547
PCT Pub. Date: Oct. 26, 2012

(65) Prior Publication Data
US 2014/0044335 A1    Feb. 13, 2014

Related U.S. Application Data

(60) Provisional application No. 61/477,030, filed on Apr. 19, 2011, provisional application No. 61/618,229, filed on Mar. 30, 2012.

(51) Int. Cl.
*G06T 11/00* (2006.01)
*G01V 3/32* (2006.01)

(52) U.S. Cl.
CPC ............. *G06T 11/003* (2013.01); *G01V 3/32* (2013.01)

(58) Field of Classification Search
CPC ............. G06T 11/003; G01R 33/5611; G01R 33/5608; G01R 33/4824
See application file for complete search history.

(56) References Cited

U.S. PATENT DOCUMENTS

| | | | |
|---|---|---|---|
| 4,999,580 A | 3/1991 | Meyer et al. | |
| 5,233,301 A | 8/1993 | Meyer et al. | |
| 5,402,067 A | 3/1995 | Pauly et al. | |
| 5,427,101 A | 6/1995 | Sachs et al. | |
| 5,485,086 A | 1/1996 | Meyer et al. | |
| 5,539,313 A | 7/1996 | Meyer | |
| 5,617,028 A | 4/1997 | Meyer et al. | |
| 5,650,723 A | 7/1997 | Meyer | |
| 5,957,843 A | 9/1999 | Pat et al. | |
| 6,020,739 A | 2/2000 | Meyer et al. | |
| 6,178,271 B1 * | 1/2001 | Maas, III | G06K 9/32 382/275 |
| 7,558,612 B2 | 7/2009 | Meyer | |
| 7,583,082 B1 | 9/2009 | Hu et al. | |
| 7,642,777 B1 | 1/2010 | Meyer et al. | |

(Continued)

OTHER PUBLICATIONS

BJ Fisher, "The Cross-Correlation and Wiener-Khinchin Theorems", 2008, pp. 1-3.*

*Primary Examiner* — Siamak Harandi
(74) *Attorney, Agent, or Firm* — Robert J. Decker

(57) ABSTRACT

A method and system for providing a fast image reconstruction of magnetic resonance spectroscopic imaging (MRSI) data based on applying, at least in part, interferometric techniques using a single receiver element. The images are reconstructed through temporally cross-correlating spacially incoherent k-space locations.

51 Claims, 8 Drawing Sheets

(56) References Cited

U.S. PATENT DOCUMENTS

| | | |
|---|---|---|
| 7,888,935 B1 | 2/2011 | Tan et al. |
| 2003/0193337 A1 | 10/2003 | Meyer |
| 2005/0001619 A1 | 1/2005 | Kiefer |
| 2010/0001727 A1 | 1/2010 | Frydman et al. |
| 2010/0141256 A1* | 6/2010 | Feng ................ G01R 33/50 324/309 |
| 2011/0006768 A1* | 1/2011 | Ying ................ G01R 33/5611 324/309 |

* cited by examiner

Standard
(257 Phase Encodes)

Incoherent (readout gradient)

Interferometry
(39 Phase Encodes)

Standard

Interferometry

Standard

Interferometry

INTERFEROMETRIC TECHNIQUES FOR MAGNETIC RESONANCE IMAGING

REFERENCE TO RELATED APPLICATIONS

The present application is a nation stage filing of International Application No. PCT/US2012/034305, filed Apr. 19, 2012, which claims priority under 35 U.S.C. §119(e) from U.S. Provisional Application Ser. No. 61/477,030, filed Apr. 19, 2011, entitled "Interferometric Techniques for Magnetic Resonance Imaging and Ser. No. 61/618,229, filed Mar. 30, 2012, entitled "Interferometric Techniques for Magnetic Resonance Imaging;" the disclosures of which are hereby incorporated by reference herein in their entirety.

STATEMENT OF GOVERNMENT INTEREST

This invention was made with the Government support under Grant Nos. R01HL079110 and RT32HL007284, awarded by National Institute of Health (NIH). The Government has certain rights in the invention.

FIELD OF THE INVENTION

The present invention is directed to image reconstruction and more particularly to applying interferometric techniques to magnetic resonance imaging reconstruction by temporally cross-correlating spatially incoherent k-space locations.

BACKGROUND OF THE INVENTION

Magnetic resonance imaging (MRI) is a medical imaging technique used to visualize the internal structure of human systems. MR images are formed through measuring the magnetization alignment of internal tissues and converting these magnetic fields to human-readable images, or other subject images. Unlike standard computed tomography (CT) scans that require dangerous ionizing radiation, MRI scans are harmless to the patient and offer enhanced contrast resolution.

Current MRI scans can take over two hours to complete. Since MRI machines cost hundreds of thousands of dollars, and staffing MRI centers can be expensive, any reduction in scan time will result in substantial savings as well as other related benefits. Furthermore, any improvement in image resolution without increasing scan time is similarly beneficial, as images with improved resolution better aid radiologists in diagnosing illnesses and injuries. The embodiments of the invention disclosed allow MRI technicians to generate standard quality images in less time, or alternatively to generate superior images in the same amount of time.

Interferometry refers to a class of techniques that superimpose electromagnetic waves together to obtain meaningful information from those waves. In radio astronomy, for instance, an array of telescopes act together as an interferometer to obtain higher quality images than would be available using only a single telescope. Direct application of spatial interferometry for nuclear magnetic resonance (NMR) and MRI has been rejected as impossible, however, due to the extreme distances (tens of thousands of miles) between receiver elements that would be necessary.

What has emerged is the need for a MRI image reconstruction technique that offers both computational efficiency and accuracy.

SUMMARY OF THE INVENTION

An aspect of an embodiment of the present invention allows, among other things, MRI technicians or applicable user to generate suitable images in less time than other methods, or alternatively to generate superior images in the same time. Accordingly, an aspect of an embodiment of the present invention provides an MR spectroscopic image reconstruction technique that offers both computational efficiency and accuracy. An aspect of an embodiment of the present invention provides a fast image reconstruction method and system. An aspect of an embodiment of the present invention allows MRI technicians or other applicable user to generate standard quality images in less time. It should be appreciated that an aspect of an embodiment of the present invention may also be applicable to non-spectroscopic MR image reconstruction techniques that offers both computational efficiency and accuracy.

To achieve the above and other results, an embodiment of the present invention is directed to applying interferometric techniques to magnetic resonance spectroscopic imaging (MRSI) reconstruction based on temporally cross-correlating k-space locations under a state of spatial incoherence. Similarly, an aspect of an embodiment of the present invention may be directed to applying interferometric techniques to magnetic resonance non-spectroscopic imaging reconstruction.

In at least some embodiments, the present invention implements a new fast image reconstruction method based on applying interferometric techniques to MRSI data through temporally cross-correlating k-space readouts using a single receiver element. This algorithm can be performed rapidly with developed computational strategies with a high degree of accuracy. The aspects of the present invention may be implemented as a computer program, computer method, machine readable medium, executable instructions, and computer program product. Further, said present invention method, system, computer system, or computer program may be implemented with MRSI systems. Similarly, an aspect of an embodiment of the present invention may be directed to applying interferometric techniques to MRI data, as well implemented with MRI systems.

In one of the embodiments, we introduce a new faster alternative to MR spectroscopic image reconstruction (or MR non-spectroscopic if applicable) wherein incoherent k-space readouts are temporally cross-correlated and passed through an inverse Fourier transform to form an image. Compared to other embodiments in the past, this method requires significantly fewer k-space location measurements to generate an image of comparable resolution and accuracy. Moreover, the spatial limitation of traditional interferometry is overcome because only a single receiver element is used.

The system embodiment of the invention involves a modified MRI system or uniquely configured system wherein the MRI system's processor runs the computational method described and disclosed herein.

An aspect of an embodiment of the present invention provides, but not limited thereto, a method for reconstructing a spectroscopic image of an object. The method may comprise: (a) taking magnetic resonance imaging data of the object; (b) temporally cross-correlating multiple k-space locations of said data to map a new correlation domain; and (c) forming a spectroscopic image using said new correlation domain that may be transmitted to an output module or display module or combination thereof.

An aspect of an embodiment of the present invention provides, but not limited thereto, a system for reconstructing a spectroscopic image of an object. The system may comprise: (a) an image data taking device configured for taking magnetic resonance imaging data of the object; (b) a processor, in communication with the image data taking device, wherein said processor is configured for: temporally cross-correlating multiple k-space locations of said data to map a new correlation domain; and forming a spectroscopic image using said new correlation domain; and (c) an output module or display module or combination thereof for receiving said formed spectroscopic image.

An aspect of an embodiment of the present invention provides, but not limited thereto, a machine readable medium having executable instructions stored thereon for performing a method for reconstructing a spectroscopic image of an object. The method may comprise: (a) acquiring magnetic resonance imaging data of the object; (b) temporally cross-correlating multiple k-space locations of said data to map a new correlation domain; (c) forming spectroscopic image data using said new correlation domain; and (d) providing said formed spectroscopic image data to an output module or display module.

An aspect of an embodiment of the present invention provides, but not limited thereto, a method for reconstructing an image of an object. The method may comprise: (a) taking magnetic resonance imaging data of the object; (b) cross-correlating multiple k-space locations of said data to map a new correlation domain; and (c) forming an image using said new correlation domain that may be transmitted to an output module or display module or combination thereof.

An aspect of an embodiment of the present invention provides, but not limited thereto, a system for reconstructing an image of an object. The system may comprise: (a) an image data taking device configured for taking magnetic resonance imaging data of the object; (b) a processor, in communication with the image data taking device, wherein said processor is configured for: cross-correlating multiple k-space locations of said data to map a new correlation domain; and forming an image using said new correlation domain; and (c) an output module or display module or combination thereof for receiving said formed image.

An aspect of an embodiment of the present invention provides, but not limited thereto, a machine readable medium having executable instructions stored thereon for performing a method for reconstructing a spectroscopic image of an object. The method may comprise: (a) acquiring magnetic resonance imaging data of the object; (b) cross-correlating multiple k-space locations of said data to map a new correlation domain; (c) forming image data using said new correlation domain; and (d) providing said formed spectroscopic image data to an output module or display module.

These and other objects, along with advantages and features of various aspects of embodiments of the invention disclosed herein, will be made more apparent from the description, drawings and claims that follow.

DESCRIPTION OF THE DRAWINGS

The accompanying drawings, which are incorporated into and form a part of the instant specification, illustrate several aspects and embodiments of the present invention and, together with the description herein, serve to explain the principles of the invention. The drawings are provided only for the purpose of illustrating select embodiments of the invention and are not to be construed as limiting the invention.

FIGS. 3A-3G illustrate a progression whereby a large $\Delta k$ domain can be generated from a smaller domain k through a series of permutations of $k_1$ and $k_2$. While the lines drawn in the figures only portray the generation of negative $\Delta k$ values, the generation of positive $\Delta k$ values can be obtained using the same method.

DETAILED DESCRIPTION OF EXEMPLARY EMBODIMENTS OF THE INVENTION

An aspect of an embodiment of the present invention may begin, for example, by collecting temporal k-space MRSI readouts, $S(k,t)$, of an underlying object, $s(r,f)$. The number of k-space locations (phase encodes) measured can be significantly fewer than would be required using conventional methods for reasons described below.

An aspect of an embodiment of the present invention creates a new domain by temporally cross-correlating different k-space locations from the existing readouts of $S(k,t)$. The data from two different k-space locations can be temporally cross-correlated to produce the mutual coherence function $$\Gamma(k_1,k_2,\tau) = \int S(k_1,t) S^*(k_2, t-\tau) dt,$$

where the asterisk denotes the complex conjugate. An aspect of an embodiment of the present invention combines the application of the van Cittert-Zernike theorem for a spatially incoherent source with intensity $I(r)$, $$\Gamma(k,t) = \iint I(r) e^{-\pi i r \cdot k} dr dr,$$

with the Wiener-Khinchin theorem for power spectral density $\Phi_x(f)$ of a function $x(t)$, $$\Phi_x(f) = \int x(t) x^*(t-\tau) e^{-2\pi i t f} dt.$$

The resulting mutual coherence function is equivalent to the Fourier transform of the image squared:

$$\Gamma(\Delta k, \tau) = \iint |s(r,f)|^2 e^{ir \cdot \Delta k - i\tau f} dr df.$$

The Van Cittert-Zernike and Wiener-Khinchin theorems are often used in radio astronomy for interferometry purposes. It should be appreciated that other types of spectral theorems, interferometric theorems, and mathematical transforms may be employed within the context of the present invention. Strictly, the Van Cittert-Zernike theorem applies only to spatially incoherent sources; any two voxels that oscillate at the same frequency will interfere and confound each other in subsequent transformations of the data. An aspect of an embodiment of the present invention makes the k-space locations spatially incoherent in the spectral domain by applying a magnetic gradient during data collection. Alternatively, the information from sufficiently long readout times from a quasi-monochromatic source (i.e., readouts longer than one over the spectral linewidth) will behave in an incoherent manner. Using either method, the application of the Van Cittert-Zernike theorem is possible.

Figure 1:
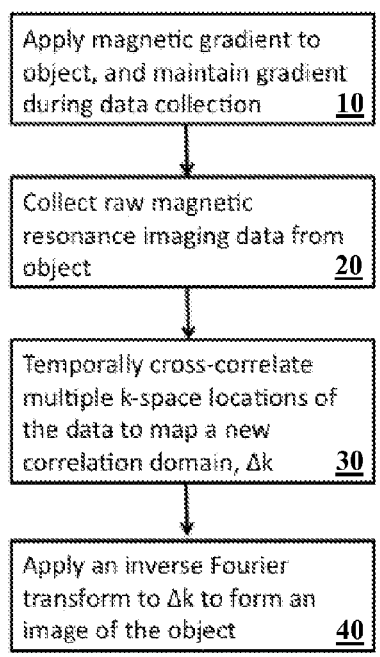
FIG. 1 provides a flow chart of an embodiment of the present invention MR spectroscopic image reconstruction method. Alternatively, an approach may be directed toward MR non-spectroscopic image reconstruction.

By applying an inverse Fourier transform to $\Gamma(\Delta k, t)$, an aspect of an embodiment obtains the squared image of the object, $|s(r,f)|^2$. An aspect of the embodiment may also obtain a reconstruction of the image by applying an inverse Fourier transform to $\Gamma(\Delta k, t)$ and summing over a square root. The absolute value of the spectroscopic image, $|s(r,f)|$, is formed by summing over a square root after applying the inverse Fourier transform. Reconstructing the image in this manner generates the absolute value of the image, $s|(r,f)|$. An exemplary method of an embodiment from data collection to image reconstruction is summarized by the flowchart provided in FIG. 1. For instance, step 10 includes applying a magnetic gradient to object, and maintain gradient during data collection. Step 20 includes collecting magnetic resonance imaging data from object. Step 30 includes temporally cross-relating multiple k-space locations of the data to map a new correlation domain, $\Delta k$. Step 40 includes applying an Inverse Fourier transform to $\Delta k$ to form an image of the object.

Figure 2A:
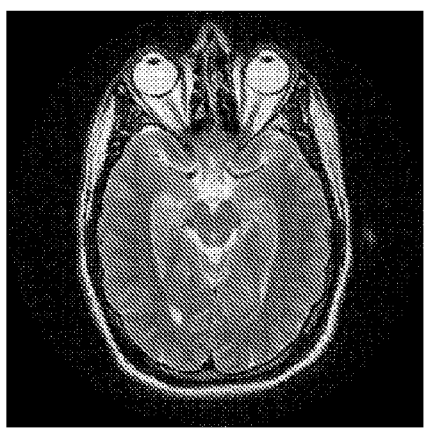
FIG. 2A provides a photographic depiction of a cross-sectional image of a human head reconstructed using conventional MR techniques.
Figure 2B:
FIG. 2B provides a photographic depiction of an approximation of a square of the cross-sectional image shown in FIG. 2A. The depiction was created by reducing the gamma of the depiction in FIG. 2A to simulate the effects of summing over a square.
Figure 3A:
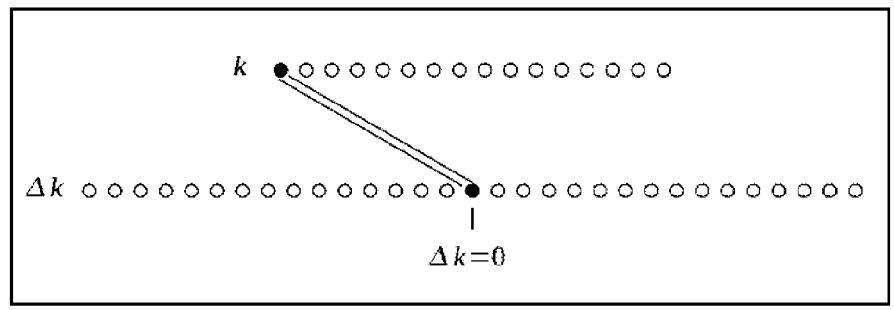
FIGS. 3A-3G provide an illustration that demonstrates how cross-correlating different locations in k-space can generate a larger domain in a new space, defined as $\Delta k$. The lines drawn between the two domains indicate the k-space locations that are being subtracted and the $\Delta k$ locations that are being generated.
Figure 3B:
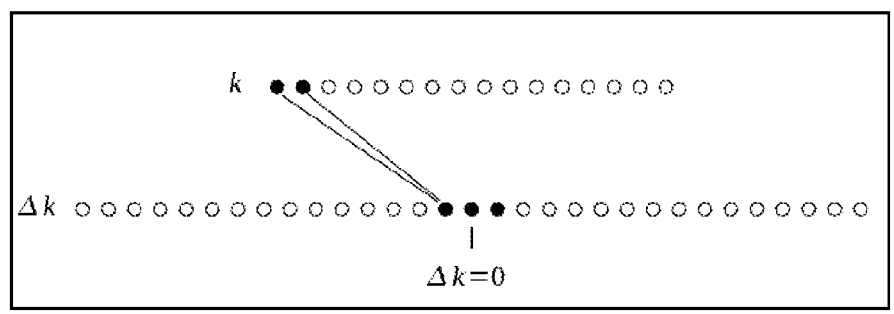
Figure 3C:
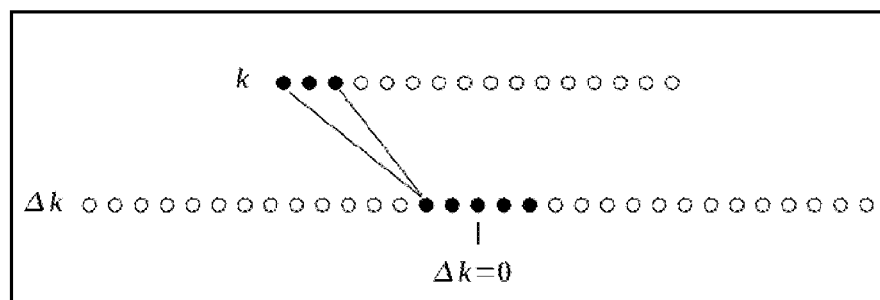
Figure 3D:
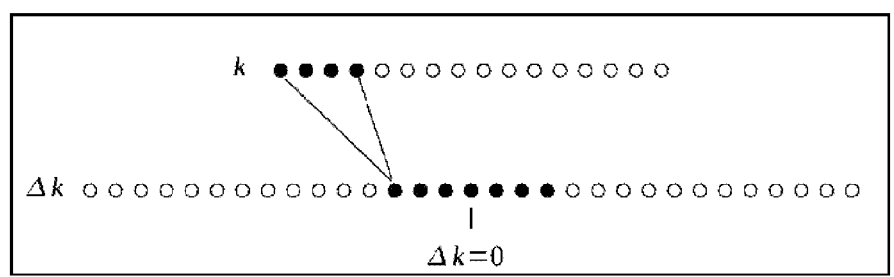
Figure 3E:
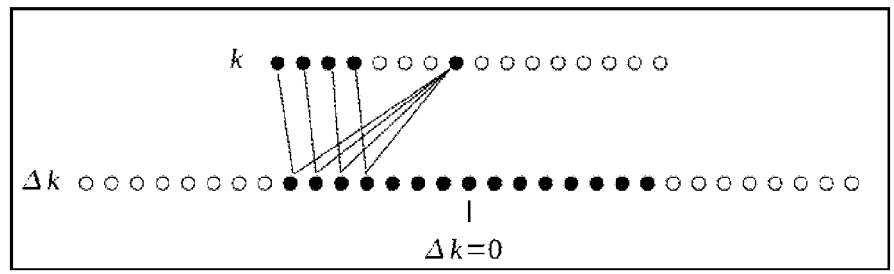
Figure 3F:
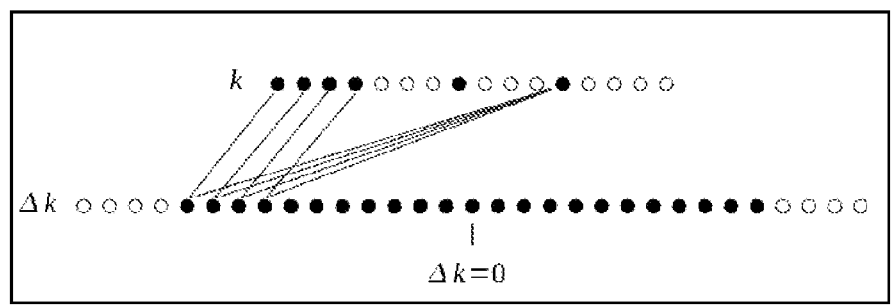
Figure 3G:
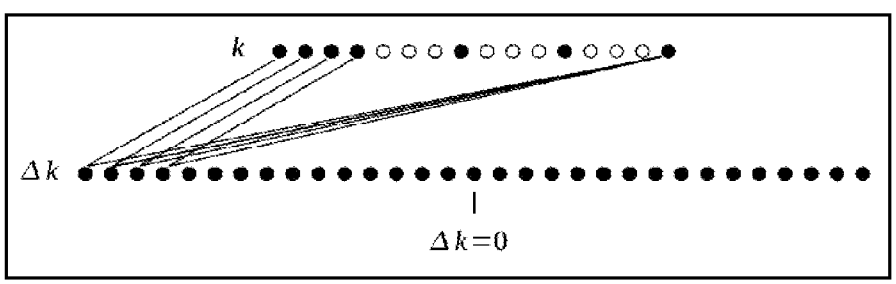

The squared image of the object is substantially similar to the original image of the object. For example, FIGS. 2A and 2B provide photographic depictions portraying an image and its simulated square, respectively. FIGS. 2A and 2B reveal that the square of the image performs the same function as the underlying image itself—the underlying structure of the object in the squared image can be appreciated with equal clarity and resolution as the underlying image. Alternatively, the absolute value of the spectroscopic image, $|s(r,f)|$, may be obtained by summing over a square root as described herein.

It may be noted that Gamma does not map the coherence function to the relative position of receiver elements as it might in radio astronomy. Rather, Gamma is dependent on the relative difference in two k-space locations, $k_1$ and $k_2$. An aspect of an embodiment of the present invention defines this difference $\Delta k$ as $\Delta k = k_1 - k_2$, although other embodiments may define $\Delta k$ differently. As a result, only one receiver element is required, although the method could be performed in an MRSI system with multiple coils.

There are two significant advantages to using $\Delta k$ in the place of individual k-space locations $k_i$ when reconstructing an image. First, images of comparable resolution can be obtained using fewer k-space locations (phase encodes) than when using conventional MRSI techniques. This means that comparable MR spectroscopic images can be obtained using the above technique in substantially less time. Second, spectroscopic images of higher resolution can be obtained when using an equal number of k-space locations (phase encodes) than would be used in conventional MRSI techniques. See, for example, FIGS. 7A and 7B.

Figure 4:
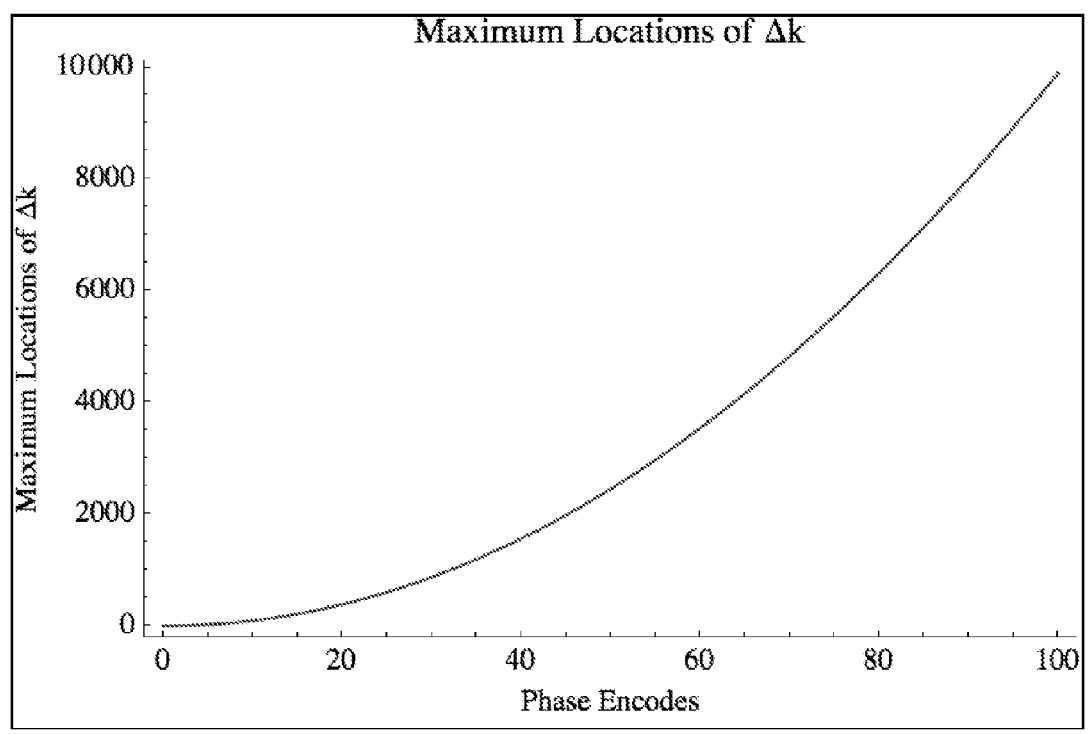
FIG. 4 provides a graphical representation of the maximum possible $\Delta k$-locations that can be generated using a given number of phase encodes.

As mentioned above, an advantage to using $\Delta k$ rather than k is that images may be formed in less time or alternatively with higher resolution. This is because, among other things, using the formula $\Delta k=k_1-k_2$, when N number of k-space locations are measured, can generate a maximum of N(N−1) number of $\Delta k$ space locations. For example, if k=1, k=2, and k=3 are measured, $\Delta k=1-3=-2$, $\Delta k=1-2=-1$, $\Delta k=1-1=0$, $\Delta k=2-1=1$, and $\Delta k=3-1=2$ may all be calculated. This effect is illustrated in FIGS. 3A-3G and FIG. 4. FIGS. 3A-3G provide an illustration that demonstrates how cross-correlating different locations in k-space can generate a larger domain in a new space, defined as $\Delta k$. The lines drawn between the two domains indicate the k-space locations that are being subtracted and the $\Delta k$ locations that are being generated. FIGS. 3A-3G illustrate a progression whereby a large $\Delta k$ domain can be generated from a smaller domain k through a series of permutations of $k_1$ and $k_2$. While the lines drawn in the figures only portray the generation of negative $\Delta k$ values, the generation of positive $\Delta k$ values can be obtained using the same method. FIG. 4 provides a graphical representation of the maximum possible $\Delta k$-locations that can be generated using a given number of phase encodes. While images using $\Delta k$ locations may create images that differ from images derived from k-space locations, these differences have been experimentally shown to be trivial. See FIGS. 5A and 5B.

Figure 5A:
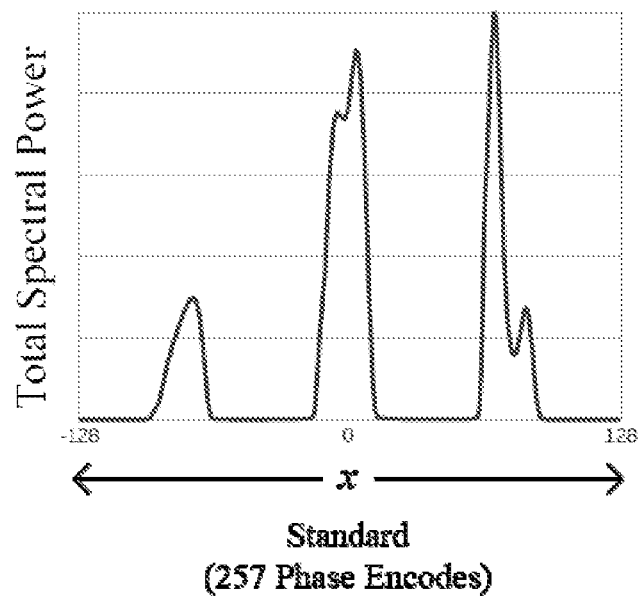
FIG. 5A provides a one-dimensional spectroscopic image of three test tubes using conventional MR spectroscopic image reconstruction methods. The x-axis of the figure represents spatial location in units of pixels, so each of the peaks corresponds to one test tube. The y-axis represents the total spectral power in the test tube at that x position, which is the integral of the squared magnitude of the magnetization over a range of temporal frequencies. Here, 257 k-space locations (phase encodes) were used to generate this image.
Figure 5B:
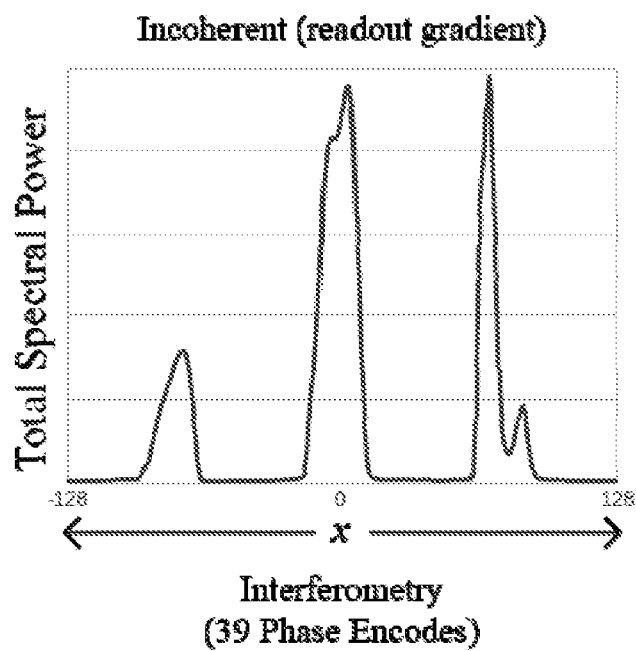
FIG. 5B provides a one-dimensional spectroscopic image of the three test tubes of FIG. 3A, whereby the image of the objects was reconstructed using an aspect of an embodiment of the present invention. Here, 39 k-space locations (phase encodes) were used to generate this image of the objects. The present invention reconstructed a substantially similar image using only a fraction of the phase encodes.

As further explained herein, FIG. 5B provides a one-dimensional spectroscopic image of the three test tubes of FIG. 5A, whereby the image of the objects was reconstructed using an aspect of an embodiment of the present invention. Here, 39 k-space locations (phase encodes) were used to generate this spectroscopic image of the objects. The present invention reconstructed a substantially similar image using only a fraction of the phase encodes. For purposes of MR spectroscopic imaging of human objects, $\Delta k$ will perform adequately in the place of k. This process of calculating and using $\Delta k$ in the place of k harnesses untapped information in k-space phase encodes, and results in a more efficient use of MR spectroscopic imaging data.

Although this particular experiment manipulated one-dimensional image of spectral data, it should be appreciated that an embodiment of the present invention may be used for higher orders of the spatial domain, i.e., more than one dimension in the spatial domain. The one-dimensional example provided herein is merely illustrative and should not be construed as limiting an embodiment of the present invention to lower-order spectroscopic data.

Figure 6:
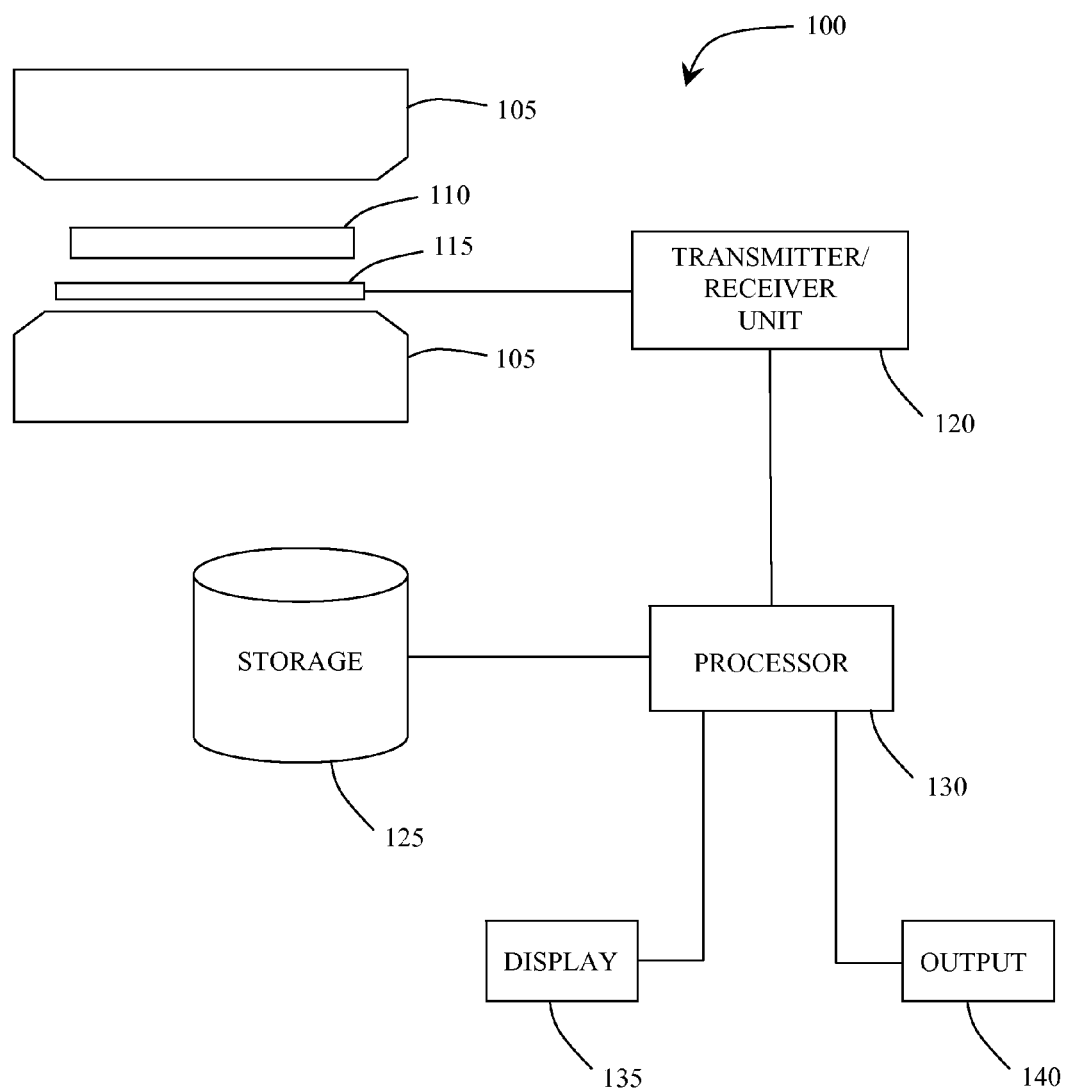
FIG. 6 provides a block diagram showing a system on which the present invention can be implemented.
Figures 9A, 9B, 9C, 9D, 9E, 9F, 9G, 9H:
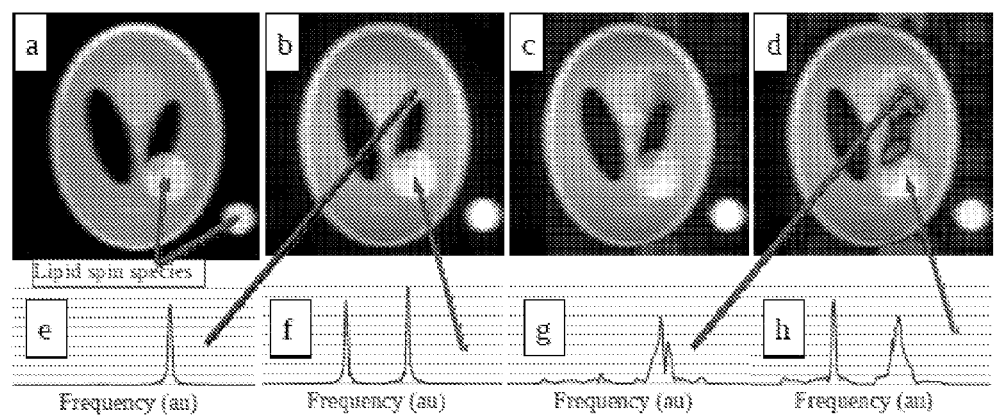
FIG. 9A provides a photographic depiction of a simulated two-dimensional spectroscopic image reconstructed using conventional MRSI techniques and 63×127 phase encodes.
FIG. 9B provides a photographic depiction of a simulated two-dimensional spectroscopic image reconstructed using an embodiment of the present invention and 63×63 phase encodes.
FIG. 9C provides a photographic depiction of a simulated two-dimensional spectroscopic image reconstructed using an embodiment of the present invention and 63×30 phase encodes.
FIG. 9D provides a photographic depiction of a simulated two-dimensional spectroscopic image reconstructed using an embodiment of the present invention and 63×25 phase encodes.
FIG. 9E provides a photographic depiction of the spectrum taken from a voxel of FIG. 9B containing water. Regarding FIGS. 9A-9D, the y-axis is the spectrum (or spectral amplitude) plotted in arbitrary units (a.u.). The x-axis is the frequency (also plotted in a.u.).
FIG. 9F provides a photographic depiction of the spectrum taken from a voxel of FIG. 9B containing a lipid (lipid spin species) and water.
FIG. 9G provides a photographic depiction of the spectrum taken from a water spin species from FIG. 9D. Coherence artifacts cause interference between the water and lipid signals.
FIG. 9H provides a photographic depiction of the spectrum taken from a lipid spin species from FIG. 9D. Coherence artifacts cause interference between the water and lipid signals.

Further evidence of this advantage of an embodiment of the present invention can be found in FIG. 9. In particular, FIGS. 9A-9D provide photographic representations of two-dimensional spectroscopic images of simulated data reconstructed using progressively fewer phase encodes. The spectroscopic image provided by FIG. 9A was reconstructed using conventional MRSI techniques and 63×127 phase encodes. FIGS. 9B-9D, however, were generated using only 63×63, 63×30, and 60×25 phase encodes, respectively. These figures indicate that an embodiment of the present invention can generate comparable results to conventional MRSI methods using a fraction of the phase encodes, thereby saving a great deal of time. In may noted that the coherence artifacts in FIGS. 9C-9D is a function of fewer phase encodes, and that ramping up the gradient pushes the ghost out of the view of view FIG. 6 provides a schematic block diagram of a magnetic resonance system 100. The system 100, or selected parts thereof, can be referred to as an MR scanner. The diagram provides a system 100 on which various embodiments as disclosed herein, or any other applicable embodiments as desired or required, can be implemented. The magnetic resonance system 100, in one example, depicts an imaging system 100 having magnet 105. The magnet 105 can provide a biasing magnetic field. A coil 115 and subject 110 are positioned within the field of magnet 105. The subject 110 can include a human body, an animal, a phantom, or other specimen. The coil 115 can include a transmit coil, a receive coil, a separate transmit coil and receive coil, or a transceiver coil. The coil 115 is in communication with a transmitter/receiver unit 120 and with a processor 130. In various examples, the coil 115 both transmits and receives radio frequency (RF) signals relative to subject 110. The transmitter/receiver unit 120 can include a transmit/receive switch, an analog-to-digital converter (ADC), a digital-to-analog converter (DAC), an amplifier, a filter, or other modules configured to excite coil 115 and to receive a signal from the coil 115. Transmitter/receiver unit 120 is coupled to the processor 330.

The processor 130 can include a digital signal processor, a microprocessor, a controller, or other module. The processor 130, in one example, is configured to generate an excitation signal (for example, a pulse sequence) for the coil 115. The processor 130, in one example, is configured to perform a post-processing operation on the signal received from the coil 115. The processor 130 is also coupled to storage 125, display 135 and output unit 140.

The storage 125 can include a memory for storing data. The data can include image data as well as results of processing performed by the processor 130. In one example, the storage 125 provides storage for executable instructions for use by the processor 130. The instructions can be configured to generate and deliver a particular pulse sequence or to implement a particular algorithm.

The display 135 can include a screen, a monitor, or other device to render a visible image corresponding to the subject 110. For example, the display 135 can be configured to display a radial projection, a Cartesian coordinate projection, photographic or video depictions, one-dimensional or two-dimensional images, or other view corresponding to subject 110. The output unit 140 can include a printer, a storage device, a network interface or other device configured to receive processed data.

The system 100 may include the MRI coil 115 for taking raw image data from the subject, the processor 130 may be capable for performing any of the operations described above or herein disclosed, the output 140 may be capable for outputting the image, and the display 135 may be capable for displaying the image. The output 140 can include one or more of a printer, storage device and a transmission line for transmitting the image to a remote location. Code for performing the above operations can be supplied to the processor 130 on a machine-readable medium or any suitable computer-readable storage medium. The machine-readable medium includes executable instructions stored thereon for performing any of the methods disclosed herein or as desired or required for practicing the present invention or aspects of the present invention.

It should be appreciated that there are numerous ways to effectively output or display the results, or any intermediate step, of an embodiment of the present invention. One common method, especially for displaying or outputting the spectral components of the data, is to provide an interactive view of a particular spectrum of interest (SOI). For instance, one may display or output the spectrum of a voxel of interest by selecting that voxel with a mouse click, mouseover, touch event, keyboard selection, or any other similar means of selecting a particular voxel. Regions of voxels may be analyzed in the same manner. The SOI can be displayed or output in high resolution, and can be subject to further post-processing steps such as, inter alia, apodization or phase correction. The SOI can be interactive in other ways, such as displaying or outputting data about a particular point or region of the spectrum (e.g., position, spectral power, or point spread function). The spectrum can be overlaid on top of the (anatomical) image to form a hybrid image, or provide an error map as to indicate the regions of low spectral integrity. For an elaboration of some of these approaches and others, see, e.g., Antonin Skoch et al., Spectroscopic imaging: Basic principles, 67 European Journal of Radiology 230-239 (2008), of which is hereby incorporated by reference herein in its entirety. It should be noted that the particular methods herein listed are for exemplary purposes only and are provided to merely illustrate some of the more common ways spectral or other image data can be transmitted to an output or display device.

It should be appreciated that the MRSI related methodologies and systems discussed throughout this disclosure may be implemented using MR non-spectroscopic imaging.

It should be appreciated that as discussed herein, the object may be a subject, as well as an inanimate object. The subject may be a human or any animal. It should be appreciated that an animal may be a variety of any applicable type, including, but not limited thereto, mammal, veterinarian animal, livestock animal or pet type animal, etc. As an example, the animal may be a laboratory animal specifically selected to have certain characteristics similar to human (e.g. rat, dog, pig, monkey), etc. It should be appreciated that the subject may be any applicable human patient, for example.

It should be appreciated that any of the components, units, or modules referred to with regards to any of the present invention embodiments discussed herein, may be integrally or separately formed with one another. Further, redundant functions or structures of the components or modules may be implemented integrally or separately. Moreover, the various components may be communicated locally and/or remotely with any technician/user/clinician/patient or machine/system/computer/processor. Moreover, the various components may be in communication via wireless and/or hardwire or other desirable and available communication means, systems and hardware.

While preferred embodiments of the invention have been set forth above, those skilled in the art who have reviewed the present disclosure will readily appreciate that other embodiments can be realized within the scope of the invention. Therefore, the invention should not be limited only by the appended claims.

EXAMPLES AND EXPERIMENTAL RESULTS

Practice of an aspect of an embodiment (or embodiments) of the invention will be still more fully understood from the following examples and experimental results, which are presented herein for illustration only and should not be construed as limiting the invention in any way.

Example and Experimental Results Set No. 1

One-dimensional spectroscopic images of three test tubes were reconstructed using conventional spectroscopic methods and an embodiment of the present invention. The conventional method reconstruction utilized 257 phase encodes, while the embodiment of the present invention reconstruction utilized only 39 phase encodes. The spectroscopic images, as shown in FIGS. 5A (conventional reconstruction) and 5B (present invention reconstruction), are substantially similar. Thus, the experiment demonstrated that an embodiment of the present invention is capable of imaging objects with a high degree of accuracy and detail with a fraction of the phase encodes.

Example and Experimental Results Set No. 2

Figure 7A:
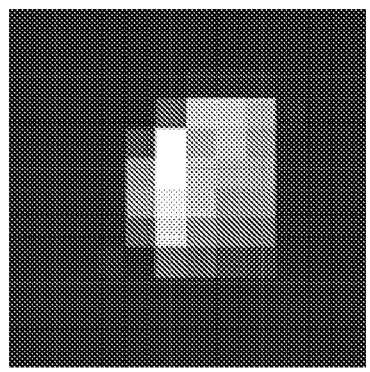
FIG. 7A provides a photographic depiction of a two-dimensional spectroscopic image of a bottle of oil placed next to a cylinder of water, reconstructed using conventional MRSI techniques. The image was created by summing the power spectra, $\Sigma_f |s(r,f)|^2$.
Figure 7B:
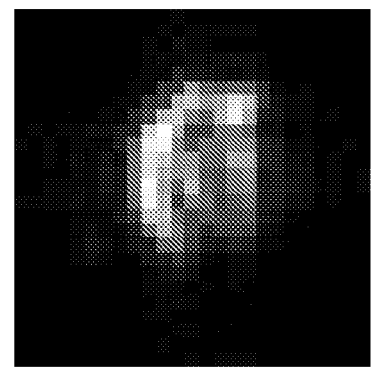
FIG. 7B provides a photographic depiction of a two-dimensional spectroscopic image using the same source data as used in FIG. 7A, but reconstructed using the present invention. The image was created by summing the power spectra.
Figure 7C:
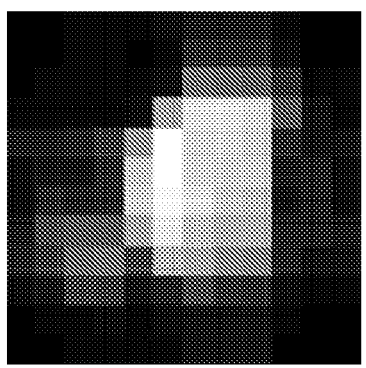
FIG. 7C provides a photographic depiction of a two-dimensional spectroscopic image formed by summing over the square root of the power spectra used to form FIG. 7A, $\Sigma_f |s(r,f)|$.
Figure 7D:
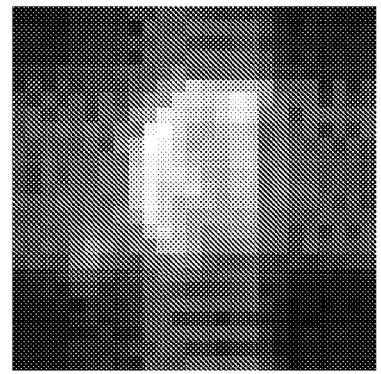
FIG. 7D provides a photographic depiction of a two-dimensional spectroscopic image formed by summing over the square root of the power spectra to form FIG. 7B.

Two-dimensional spectroscopic images of an object were reconstructed using conventional spectroscopic methods and an embodiment of the present invention. Each method utilized the same number of phase encodes. The image reconstructed by the embodiment of the present invention (as shown in FIG. 7B) was similar to the image reconstructed by the conventional method (as shown in FIG. 7A), but with a notably higher resolution. The image could also be reconstructed through summing over a square root. FIGS. 7C and 7D provide graphical representations of the spectroscopic image formed by summing over a square root using conventional methods and as aspect of the embodiment of the present invention, respectively. The experiment demonstrated that the present invention is capable of imaging objects with higher resolution than convention techniques, when utilizing an equal number of phase encodes.

Figure 8A:
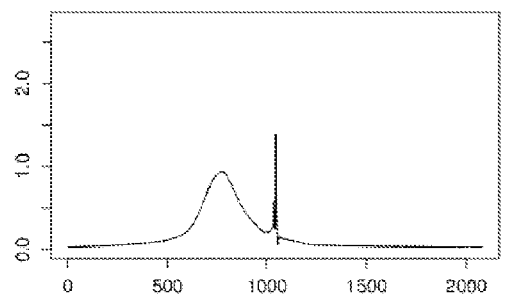
FIG. 8A provides a photographic depiction of one-dimensional spectral data taken from the peak lipid signal location (voxel) of the spectroscopic image depicted in FIG. 7C. The spectrum was obtained using conventional MRSI techniques. Regarding FIGS. 8A-8D, the y-axis is the spectrum (or spectral amplitude) plotted in arbitrary units (a.u.). The x-axis is the frequency (also plotted in a.u.).
Figure 8B:
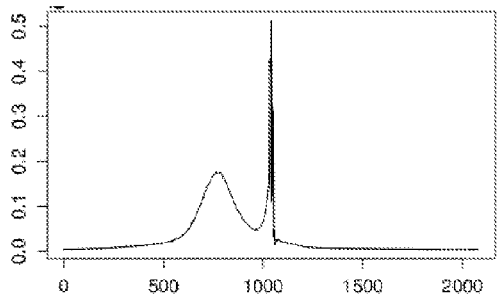
FIG. 8B provides a photographic depiction of one-dimensional spectral data taken from the peak lipid signal location (voxel) of the spectroscopic image depicted in FIG. 7D. The spectrum of the signal was obtained using an embodiment of the present invention.
Figure 8C:
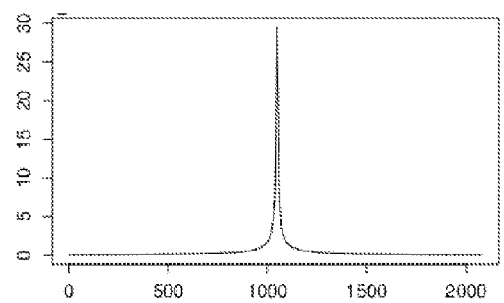
FIG. 8C provides a photographic depiction of one-dimensional spectral data taken from the peak water signal location (voxel) of the spectroscopic image depicted in FIG. 7C. The spectrum was obtained using conventional MRSI techniques.
Figure 8D:
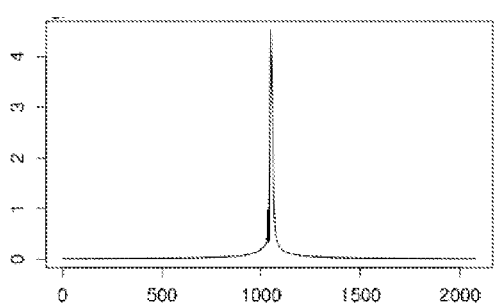
FIG. 8D provides a photographic depiction of one-dimensional spectral data taken from the peak water signal location (voxel) of the spectroscopic image depicted in FIG. 7D. The spectrum of the signal was obtained using an embodiment of the present invention.

The spectral components of the spectroscopic images depicted by FIGS. 7C and 7D were also analyzed. FIG. 8A provides a photographic depiction of one-dimensional spectral data taken from the peak lipid signal location (voxel) of the spectroscopic image depicted in FIG. 7C. The spectrum was obtained using conventional MRSI techniques. In contrast, FIG. 8B provides a photographic depiction of one-dimensional spectral data taken from the peak lipid signal location of the spectroscopic image depicted in FIG. 7D. The spectrum of the signal was obtained using an embodiment of the present invention. The streaking of the water signal was stronger under an embodiment of the present invention (FIG. 8B) than for the conventional method (FIG. 8A). FIGS. 8C and 8D depict the water spectra obtained from the voxel containing the peak water signal from the spectroscopic images depicted by FIGS. 7C and 7D, respectively. These figures demonstrate that the spectral data generated by an embodiment of the present invention is substantially similar to that of conventional methods.

Example and Experimental Results Set No. 3

FIGS. 9A-9D provide photographic representations of two-dimensional spectroscopic images of simulated data reconstructed using progressively fewer phase encodes. The spectroscopic image provided by FIG. 9A was reconstructed using conventional MRSI techniques and 63×127 phase encodes. The spectroscopic image provided by FIG. 9B was reconstructed using an embodiment of the present invention and only 63×63 phase encodes. The spectroscopic images in FIGS. 9A and 9B are substantially similar, despite the fraction of phase encodes used under an embodiment of the present invention (approximately 49.6%, or R=2.0).

FIGS. 9C and 9D provide reconstructions using an embodiment of the present invention and 63×30 and 63×25 phase encodes, respectively. Coherence artifacts emerged in FIGS. 9C and 9D but could be mitigated by increasing the magnitude of the applied gradient. Alternatively, coherence artifacts may be mitigated by using more phase encodes to reconstruct the spectroscopic image, as in FIG. 9B. The images provided by FIGS. 9C and 9D were reconstructed using less than a quarter of the phase encodes required to produce FIG. 9A. Specifically, FIG. 9C was reconstructed using 23.6% (R=4.2) of the phase encodes as FIG. 9A, and FIG. 9D was reconstructed using only 19.7% of the same (R=5.1).

FIGS. 9E-9H provide photographic representations of one-dimensional spectral data obtained from particular voxels in FIGS. 9B and 9D. In particular, FIG. 9E provides a depiction of the spectrum taken from a voxel in FIG. 9B containing water spin species (i.e., a voxel representing water). FIG. 9F provides a depiction of the spectrum taken from a voxel in FIG. 9B containing lipid spin species (as indicated by the arrows in the figure).

FIGS. 9G and 9H depict water and lipid spectra taken from the indicated voxels in FIG. 9D. The voxels represent water and lipid spin species, respectively. Because of the relatively sparse number of phase encodes used to reconstruct the spectroscopic image, coherence artifacts ("ghosting") emerged due to interference. These artifacts could be mitigated or moved out of the view of view by increasing the strength of the applied magnetic gradient or using more phase encodes.

The experiment demonstrated than an embodiment of the present invention reconstructs spectroscopic images substantially similar to those obtained through conventional MRSI methods, but using a fraction of the phase encodes (and thereby saving time and processing power).

Example and Experimental Results Set No. 4

Incoherence is a necessary aspect of an embodiment of the present invention imaging method and related system. The coherence and incoherence may be defined in a traditional way with respect to interferometry, and may be further defined as provided below. For instance, regarding an aspect of an application of an embodiment of the present invention, no two voxels can resonate at the same frequency, or their signal will confound with each other. Accordingly, the gradient is added during readout, and that enforces that two voxels are not resonating together. For instance, in FIGS. 9G-9H, with lipid and water there is coherence and the signal is confounded as is evident by the ghosts.

Next, a more strict definition of coherence, incoherence and partial coherence shall be provided. To define incoherence/coherence, we note the source coherence function, for example, as well as the following interferometry related references of which are hereby incorporated by reference herein in their entirety herein: 1) Beran, Mark J., and Geroge B Jr. Parrent. 1974. *Theory of partial coherence*. Second. Society of Photo-optical Instrumentation Engineers; 2) Parrent, Geroge B Jr. 1959. "Studies in the Theory of Partial Coherence." *Optica Acta* 6 (3) (July): 285-296. doi:10.1080/713826290; 3) Swenson, G. W., and N. C. Mathur. 1968. "The interferometer in radio astronomy." *Proceedings of the IEEE* 56 (12): 2114-2130; and 4) Thompson, A. Richard, James M. Moran, and George W. Swenson Jr. 2001. *Interferometry and Synthesis in Radio Astronomy*. Second.

Wiley-VCH. For example, we have signal coming from the subject as s(r,t). Related by Fourier transform to the mutual coherence function is the source coherence function (also confusingly called the mutual coherence function) which is the temporal correlation of signal of two points in spatial domain (let \int be an integral):

$$g(r1,r2,\text{tau})=\int s(r1,t)s^*(r2,t-\text{tau})dt$$

The complex degree of coherence is defined as:

$$c(r1,r2,\text{tau})=g(r1,r2,\text{tau})/\text{Sqrt}[g(r1,r1,0)g(r2,r2,0)]$$

If c(r1,r2,tau) is 1 for all values of tau and for all pairs of points, then the source is completely coherent. If the value of c is 0 for all values of tau and for all pairs of points, then the source is completely incoherent. Everything in between those two states are considered partially coherent. In a very strict sense, a signal can be neither completely coherent nor incoherent, but without the gradient our situation is very near complete coherence. With the gradient we get a nearly incoherent source, which can have some parts exhibiting coherence and causes ghosts.

Additional Examples

Example 1 includes method for reconstructing a spectroscopic image of an object, the method comprising:
(a) taking magnetic resonance imaging data of the object;
(b) temporally cross-correlating multiple k-space locations of the data to map a new correlation domain; and
(c) forming a spectroscopic image using the new correlation domain that may be transmitted to an output module or display module or combination thereof.

Example 2 may optionally include the method of example 1, further comprising transmitting spectra from the formed spectroscopic image to an output module or display module or combination thereof.

Example 3 may optionally include the method of example 1 (as well as subject matter of example 2), wherein the multiple k-space locations comprise two k-space locations, $\vec{k}_1$ and $\vec{k}_2$.

Example 4 may optionally include the method of example 2 (as well as subject matter of example 3), wherein the new correlation domain, $\Delta\vec{k}$, is mapped by $\Delta\vec{k}=\vec{k}_1-\vec{k}_2$.

Example 5 may optionally include the method of examples any one of 1, 2, 3 or 4, wherein the magnetic resonance imaging data is obtained with a means for creating or simulating spatial incoherence in the spectral domain.

Example 6 may optionally include the method of example 5 (as well as subject matter of one or more of any combination of examples 1-4), wherein the incoherence creating means includes applying a magnetic gradient.

Example 7 may optionally include the method of example 5 (as well as subject matter of one or more of any combination of examples 1-6), wherein the incoherence creating means includes collecting the magnetic resonance imaging data over sufficiently long readout times.

Example 8 may optionally include the method of example 1 (as well as subject matter of one or more of any combination of examples 1-7), wherein:
(a) the magnetic resonance imaging data is obtained by collecting multiple temporal k-space readouts, S(k,t);
(b) the magnetic resonance imaging data is obtained while a magnetic gradient is applied to the object as a means of creating spatial incoherence in the spectral domain;
(c) the data from two different k-space locations in the readouts are temporally cross-correlated to produce a mutual coherence function, $\Gamma(k_1,k_2,\tau)$.

(d) the new correlation domain is generated by the application of the Van Cittert-Zernike and Wiener-Khinchin theorems such that the correlation domain, $\Gamma(\Delta k,t)$, is mapped by the relative difference in the k-space locations, $\Delta \vec{K}=\vec{K}_1-\vec{K}_2$; and (e) an inverse Fourier transform is applied to the new correlation domain to obtain the square of the spectroscopic image, $|s(r,f)|^2$.

Example 9 may optionally include the method of example 8 (as well as subject matter of one or more of any combination of examples 1-8), wherein a square root is taken of the square of the spectroscopic image, $|s(r,f)|^2$, to produce the absolute value of the spectroscopic image, $|s(r,f)|$.

Example 10 includes a system for reconstructing a spectroscopic image of an object, the system comprising:

(a) an image data taking device configured for taking magnetic resonance imaging data of the object;

(b) a processor, in communication with the image data taking device, wherein the processor is configured for:

temporally cross-correlating multiple k-space locations of the data to map a new correlation domain; and forming a spectroscopic image using the new correlation domain; and (c) an output module or display module or combination thereof for receiving the formed spectroscopic image.

Example 11 may optionally include the system of example 10, wherein the processor is configured for providing spectra to be received by the output module or display module or combination thereof.

Example 12 may optionally include the system of example 10 (as well as subject matter of example 11), wherein the multiple k-space locations comprise two k-space locations, $\vec{K}_1$ and $\vec{K}_2$.

Example 13 may optionally include the system of example 12 (as well as subject matter of example 11), wherein the new correlation domain, $\Delta \vec{K}$, is mapped by $\Delta \vec{K}=\vec{K}_1-\vec{K}_2$.

Example 14 may optionally include the system of examples any one of 10, 11, 12 or 13, wherein the magnetic resonance imaging data is obtained with a means for creating or simulating spatial incoherence in the spectral domain.

Example 15 may optionally include the system of example 14 (as well as subject matter of one or more of any combination of examples 10-14), wherein the incoherence creating means includes applying a magnetic gradient.

Example 16 may optionally include the system of example 14 (as well as subject matter of one or more of any combination of examples 10-15), wherein the incoherence creating means includes collecting the magnetic resonance imaging data over sufficiently long readout times.

Example 17 may optionally include the system of example 10 (as well as subject matter of one or more of any combination of examples 11-16), wherein:

(a) the magnetic resonance imaging data is obtained by collecting multiple temporal k-space readouts, $S(k,t)$;

(b) the magnetic resonance imaging data is obtained while a magnetic gradient is applied to the object as a means of creating spatial incoherence in the spectral domain;

(c) the data from two different k-space locations in the readouts are temporally cross-correlated to produce a mutual coherence function, $\Gamma(k_1,k_2,\tau)$.

(d) the new correlation domain is generated by the application of the Van Cittert-Zernike and Wiener-Khinchin theorems such that the correlation domain, $\Gamma(\Delta k,t)$, is mapped by the relative difference in the k-space locations, $\Delta \vec{K}=\vec{K}_1-\vec{K}_2$;

(e) an inverse Fourier transform is applied to the new correlation domain to obtain the square of the spectroscopic image, $|s(r,f)|^2$.

Example 18 may optionally include the method of example 17 (as well as subject matter of one or more of any combination of examples 10-16), wherein a square root is taken of the square, $|s(r,f)|^2$, in the spectroscopic image to produce the absolute value of the spectroscopic image, $|s(r,f)|$.

Example 19 includes a machine readable medium having executable instructions stored thereon for performing a method for reconstructing a spectroscopic image of an object, the method comprising:

(a) acquiring magnetic resonance imaging data of the object;

(b) temporally cross-correlating multiple k-space locations of the data to map a new correlation domain;

(c) forming spectroscopic image data using the new correlation domain; and (d) providing the formed spectroscopic image data to an output module or display module.

Example 20 may optionally include the machine-readable medium of example 19, wherein the method further comprises providing spectra from the formed spectroscopic image to an output module or display module or combination thereof.

Example 21 may optionally include the machine-readable medium of example 19 (as well as subject matter of example 20), wherein the multiple k-space locations comprise two k-space locations, $\vec{K}_1$ and $\vec{K}_2$.

Example 22 may optionally include the machine readable medium of example 21 (as well as subject matter of example 20), wherein the new correlation domain, $\Delta \vec{K}$, is mapped by $\Delta \vec{K}=\vec{K}_1-\vec{K}_2$.

Example 23 may optionally include the machine-readable medium of any one of examples 19, 20, 21, or 22, wherein the magnetic resonance imaging data is obtained with a means for creating or simulating spatial incoherence in the spectral domain.

Example 24 may optionally include the machine-readable medium of example 23 (as well as subject matter of one or more of any combination of examples 19-22), wherein the incoherence creating means includes applying a magnetic gradient.

Example 25 may optionally include the machine readable medium of example 23 (as well as subject matter of one or more of any combination of examples 19-24), wherein the incoherence creating means includes collecting the magnetic resonance imaging data over sufficiently long readout times.

Example 26 may optionally include the machine readable medium of example 19 (as well as subject matter of one or more of any combination of examples 20-25), wherein:

(a) the magnetic resonance imaging data is obtained by collecting multiple temporal k-space readouts, $S(k,t)$;

(b) the magnetic resonance imaging data is obtained while a magnetic gradient is applied to the object as a means of creating spatial incoherence in the spectral domain;

(c) the data from two different k-space locations in the readouts are temporally cross-correlated to produce a mutual coherence function, $\Gamma(k_1,k_2,\tau)$.

(d) the new correlation domain is generated by the application of the Van Cittert-Zernike and Wiener-Khinchin theorems such that the correlation domain, $\Gamma(\Delta k,t)$, is mapped by the relative difference in the k-space locations, $\Delta \vec{K}=k_1-\vec{K}_2$; and (e) an inverse Fourier transform is applied to the new correlation domain to obtain the square of the spectroscopic image, $|s(r,f)|^2$.

Example 27 may optionally include the machine-readable medium of example 26 (as well as subject matter of one or more of any combination of examples 19-25), wherein a square root is taken of the square of the spectroscopic image, $|s(r,f)|^2$, to produce the absolute value of the spectroscopic image, $|s(r,f)|$.

Example 28 includes a method for reconstructing an image of an object, the method comprising:
(a) taking magnetic resonance imaging data of the object;
(b) cross-correlating multiple k-space locations of the data to map a new correlation domain; and
(c) forming an image using the new correlation domain that may be transmitted to an output module or display module or combination thereof.

Example 29 may optionally include the method of example 28, further comprising transmitting the formed image to an output module or display module or combination thereof.

Example 30 may optionally include the method of examples 28 (as well as subject matter of example 29), wherein the multiple k-space locations comprise two k-space locations, $\vec{k}_1$ and $\vec{k}_2$.

Example 31 may optionally include the method of example 30 (as well as subject matter of one or more of any combination of examples 28-29), wherein the new correlation domain, $\Delta\vec{k}$, is mapped by $\Delta\vec{k}=\vec{k}_1-\vec{k}_2$.

Example 32 may optionally include the method of any one of examples 28, 29, 30, or 31, wherein the magnetic resonance imaging data is obtained with a means for creating or simulating incoherence in at least one of the following domains: relaxation, perfusion, diffusion, velocity, or temperature.

Example 33 may optionally include the method of example 32 (as well as subject matter of one or more of any combination of examples 28-31), wherein the incoherence creating means includes applying a magnetic gradient or introducing a shim.

Example 34 may optionally include the method of example 32 (as well as subject matter of one or more of any combination of examples 28-33), wherein the incoherence creating means includes collecting the magnetic resonance imaging data over sufficiently long readout times.

Example 35 may optionally include the method of example 32 (as well as subject matter of one or more of any combination of examples 28-34), wherein the incoherence creating means provides inhomogeneity within the domains.

Example 36 includes a system for reconstructing an image of an object, the system comprising:
(a) an image data taking device configured for taking magnetic resonance imaging data of the object;
(b) a processor, in communication with the image data taking device, wherein the processor is configured for:
  cross-correlating multiple k-space locations of the data to map a new correlation domain; and
  forming an image using the new correlation domain; and
(c) an output module or display module or combination thereof for receiving the formed image.

Example 37 may optionally include the system of example 36, wherein the processor is configured for providing the formed image to be received by the output module or display module or combination thereof.

Example 38 may optionally include the system of example 36 (as well as subject matter of example 37), wherein the multiple k-space locations comprise two k-space locations, $\vec{k}_1$ and $\vec{k}_2$.

Example 39 may optionally include the system of example 38 (as well as subject matter of one or more of any combination of examples 36-37), wherein the new correlation domain, $\Delta\vec{k}$, is mapped by $\Delta\vec{k}=\vec{k}_1-\vec{k}_2$.

Example 40 may optionally include the system of any one of examples 36, 37, 38, or 39, wherein the magnetic resonance imaging data is obtained with a means for creating or simulating incoherence in at least one of the following domains: relaxation, perfusion, diffusion, velocity, or temperature.

Example 41 may optionally include the system of example 40 (as well as subject matter of one or more of any combination of examples 36-39), wherein the incoherence creating means includes applying a magnetic gradient or introducing a shim.

Example 42 may optionally include the system of example 40 (as well as subject matter of one or more of any combination of examples 36-41), wherein the incoherence creating means includes collecting the magnetic resonance imaging data over sufficiently long readout times.

Example 43 may optionally include the system of example 40 (as well as subject matter of one or more of any combination of examples 36-42), wherein the incoherence creating means provides inhomogeneity within the domains.

Example 44 includes a machine readable medium having executable instructions stored thereon for performing a method for reconstructing a spectroscopic image of an object, the method comprising:
(a) acquiring magnetic resonance imaging data of the object;
(b) cross-correlating multiple k-space locations of the data to map a new correlation domain;
(c) forming image data using the new correlation domain; and
(d) providing the formed spectroscopic image data to an output module or display module.

Example 45 may optionally include the machine-readable medium of example 44, wherein the executable instructions are configured for a computer processor.

Example 46 may optionally include the machine-readable medium of example 45, wherein the multiple k-space locations comprise two k-space locations, $\vec{k}_1$ and $\vec{k}_2$.

Example 47 may optionally include the machine readable medium of example 46, wherein the new correlation domain, $\Delta\vec{k}$, is mapped by $\Delta\vec{k}=\vec{k}_1-\vec{k}_2$.

Example 48 may optionally include the machine-readable medium of any one of examples 44, 45, 46, or 47, wherein the magnetic resonance imaging data is obtained with a means for creating or simulating incoherence in at least one of the following domains: relaxation, perfusion, diffusion, velocity, or temperature.

Example 49 may optionally include the machine-readable medium of example 48 (as well as subject matter of one or more of any combination of examples 44-47), wherein the incoherence creating means includes applying a magnetic gradient or introducing a shim.

Example 50 may optionally include the machine readable medium of example 48 (as well as subject matter of one or more of any combination of examples 44-49), wherein the incoherence creating means includes collecting the magnetic resonance imaging data over sufficiently long readout times.

Example 51 may optionally include the machine readable medium of example 48 (as well as subject matter of one or more of any combination of examples 44-50), wherein the incoherence creating means provides inhomogeneity within the domains.

The devices, systems, compositions, machine readable medium, computer program products, and methods of various embodiments of the invention disclosed herein may utilize aspects disclosed in the following references, applications, publications and patents and which are hereby incorporated by reference herein in their entirety:

1. U.S. Pat. No. 7,888,935, Feb. 15, 2011, K-space trajectory estimation in spiral MRI system and related method thereof, Tan, Hao, Charlottesville, Va., United States of America (US), United States of America (US); Meyer, Craig H.;
2. U.S. Pat. No. 7,642,777, Jan. 5, 2010, Fast automatic linear off-resonance correction method for spiral imaging, Meyer, Craig H.;
3. U.S. Pat. No. 7,583,082, Sep. 1, 2009, Partially parallel magnetic resonance imaging using arbitrary k-space trajectories with image reconstruction based on successive convolution operations, Hu, Peng, Meyer, Craig H.;
4. U.S. Pat. No. 7,558,612, Jul. 7, 2009, Motion compensated spiral FISP MRI, Meyer, Craig H.;
5. U.S. Pat. No. 6,020,739, Feb. 1, 2000, Rapid method of optimal gradient waveform design for MRI, Meyer, Craig, H.;
6. U.S. Pat. No. 5,957,843, Sep. 28, 1999, Partial flyback echo-planar imaging, Luk Pat, Gerard T., Stanford, United States of America (US); Meyer, Craig H.;
7. U.S. Pat. No. 5,650,723, Jul. 22, 1997, Full echo spiral-in/spiral-out magnetic resonance imaging, Meyer, Craig, H.;
8. U.S. Pat. No. 5,617,028, Apr. 1, 1997, Magnetic field inhomogeneity correction in MRI using estimated linear magnetic field map, Meyer, Craig, H.;
9. U.S. Pat. No. 5,539,313, Jul. 23, 1996, Full echo spiral-in/spiral-out magnetic resonance imaging, Meyer, Craig, H.;
10. U.S. Pat. No. 5,485,086, Jan. 16, 1996, Continuous fluoroscopic MRI using spiral k-space scanning, Meyer, Craig, H.;
11. U.S. Pat. No. 5,427,101, Jun. 27, 1995, Diminishing variance process for real-time reduction of motion artifacts in MRI, Sachs, Todd S., Beachwood, United States of America (US); Meyer, Craig H.;
12. U.S. Pat. No. 5,402,067, Mar. 28, 1995, Apparatus and method for rare echo imaging using k-space spiral coverage, Pauly, John, M., San Francisco, Calif., United States(US); Spielman, Daniel, M., San Jose, Calif., United States(US); Meyer, Craig, H.;
13. U.S. Pat. No. 5,233,301, Aug. 3, 1993, High resolution/reduced slice width magnetic resonance imaging and spectroscopy by signal combination and use of minimum phase excitation pulses, Meyer, Craig, H.;
14. U.S. Pat. No. 4,999,580, Mar. 12, 1991, magnetic resonance imaging and spectroscopy using a single excitation pulse for simultaneous spatial and spectral selectivity, Meyer, Craig, H.;
15. US Publication Application No. 2003/0193337, Oct. 16, 2003, Motion compensated spiral FISP MRI, Meyer, Craig, H.

In summary, while the present invention has been described with respect to specific embodiments, many modifications, variations, alterations, substitutions, and equivalents will be apparent to those skilled in the art. The present invention is not to be limited in scope by the specific embodiment described herein. Indeed, various modifications of the present invention, in addition to those described herein, will be apparent to those of skill in the art from the foregoing description and accompanying drawings. Accordingly, the invention is to be considered as limited only by the spirit and scope of the following claims, including all modifications and equivalents.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Unless clearly specified to the contrary, there is no requirement for any particular described or illustrated activity or element, any particular sequence or such activities, any particular size, speed, material, dimension or frequency, or any particularly interrelationship of such elements. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all sub ranges therein. Any information in any material (e.g., a United States/foreign patent, United States/foreign patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

We claim:

1. A method for reconstructing a spectroscopic image of an object, the method comprising:
    (a) taking magnetic resonance imaging data of the object;
    (b) temporally cross-correlating multiple k-space locations of said data to map a new correlation domain, the new correlation domain representative of a Fourier transform of a function defining a spectroscopic image, squared; and
    (c) forming the spectroscopic image using said new correlation domain as a representation for transmission to an output module or display module or combination thereof, the forming including performing an inverse transform on the new correlation domain.

2. The method of claim 1, further comprising transmitting spectra from said formed spectroscopic image to an output module or display module or combination thereof.

3. The method of claim 1, wherein said multiple k-space locations comprise two k-space locations, $\vec{k}_1$ and $\vec{k}_2$.

4. The method of claim 3, wherein said new correlation domain, $\Delta \vec{k}$, is mapped by a relative difference in k-space locations where $\Delta \vec{k} = \vec{k}_1 - \vec{k}_2$.

5. The method of any one of claim 1, 2, 3 or 4, wherein said magnetic resonance imaging data is obtained with a circuit configured to create or simulate spatial incoherence in a spectral domain.

6. The method of claim 5, wherein said circuit is configured to apply a magnetic gradient to establish spatial incoherence in the spectral domain.

7. The method of claim 5, wherein said circuit is configured to collect said magnetic resonance imaging data over sufficiently long readout times.

8. The method of claim 4, wherein:
(a) said magnetic resonance imaging data is obtained by collecting multiple temporal k-space readouts, $S(k,t)$;
(b) said magnetic resonance imaging data is obtained while a magnetic gradient is applied to said object as a technique for creating spatial incoherence in a spectral domain;
(c) said data from two different k-space locations in said readouts are temporally cross-correlated to produce a mutual coherence function, $\Gamma(k_1, k_2, \tau)$;
(d) said new correlation domain is generated by applying Van Cittert-Zernike and Wiener-Khinchin theorems such that a resulting mutual coherence function, $\Gamma(\Delta k, t)$, is mapped by the relative difference in the k-space locations, $\Delta \vec{k} = \vec{k}_1 - \vec{k}_2$; and
(e) an inverse Fourier transform is applied to said new correlation domain to obtain a square of the spectroscopic image, $|s(r,f)|^2$.

9. The method of claim 8, wherein a square root is taken of the square of the spectroscopic image, $|s(r,f)|^2$, to produce an absolute value of the spectroscopic image, $|s(r,f)|$.

10. A system for reconstructing a spectroscopic image of an object, the system comprising:
(a) an image data taking device configured for taking magnetic resonance imaging data of the object;
(b) a processor, in communication with the image data taking device, wherein said processor is configured for:
temporally cross-correlating multiple k-space locations of said data to map a new correlation domain, the new correlation domain representative of a Fourier transform of a function defining a spectroscopic image, squared; and
forming a spectroscopic image using said new correlation domain including performing an inverse transform on the new correlation domain; and
(c) an output module or display module or combination thereof for receiving said formed spectroscopic image.

11. The system of claim 10, wherein said processor is configured for providing spectra to be received by said output module or display module or combination thereof.

12. The system of claim 10, wherein said multiple k-space locations comprise two space locations, $\vec{k}_1$ and $\vec{k}_2$.

13. The system of claim 12, wherein said new correlation domain, $\Delta \vec{k}$, is mapped by a relative difference in k-space locations where $\Delta \vec{k} = \vec{k}_1 - \vec{k}_2$.

14. The system of any one of claim 10, 11, 12 or 13, wherein said magnetic resonance imaging data is obtained with a circuit configured to create or simulate spatial incoherence in a spectral domain.

15. The system of claim 14, wherein said circuit is configured to apply a magnetic gradient to establish spatial incoherence in the spectral domain.

16. The system of claim 14, wherein said circuit is configured to collect said magnetic resonance imaging data over sufficiently long readout times.

17. The system of claim 13, wherein:
(a) said magnetic resonance imaging data is obtained by collecting multiple temporal k-space readouts, $S(k,t)$;
(b) said magnetic resonance imaging data is obtained while a magnetic gradient is applied to said object as a technique for creating spatial incoherence in a spectral domain;
(c) said data from two different k-space locations in said readouts are temporally cross-correlated to produce a mutual coherence function, $\Gamma(k_1, k_2, \tau)$;
(d) said new correlation domain is generated by applying Van Cittert-Zernike and Wiener-Khinchin theorems such that a resulting mutual coherence function, $\Gamma(\Delta k, t)$, is mapped by the relative difference in the k-space locations, $\Delta \vec{k} = \vec{k}_1 - \vec{k}_2$; and
(e) an inverse Fourier transform is applied to said new correlation domain to obtain a square of the spectroscopic image, $|s(r,f)^2|$.

18. The method of claim 17, wherein a square root is taken of the square, $|s(r,f)|^2$, in the spectroscopic image to produce an absolute value of the spectroscopic image, $|s(r,f)|$.

19. A non-transitory machine-readable medium having executable instructions stored thereon for performing a method for reconstructing a spectroscopic image of an object, the method comprising:
(a) acquiring magnetic resonance imaging data of the object;
(b) temporally cross-correlating multiple k-space locations of said data to map a new correlation domain, the new correlation domain representative of a Fourier transform of a function defining a spectroscopic image, squared;
(c) forming spectroscopic image data using said new correlation domain, the forming including performing an inverse transform on the new correlation domain; and
(d) providing said formed spectroscopic image data to an output module or display module.

20. The non-transitory machine-readable medium of claim 19, wherein said method further comprises providing spectra from said formed spectroscopic image to an output module or display module or combination thereof.

21. The non-transitory machine-readable medium of claim 19, wherein said multiple k-space locations comprise two k-space locations, $\vec{k}_1$ and $\vec{k}_2$.

22. The non-transitory machine-readable medium of claim 21, wherein said new correlation domain, $\Delta \vec{k}$, is mapped by a relative difference in k-space locations where $\Delta \vec{k} = \vec{k}_1 - \vec{k}_2$.

23. The non-transitory machine-readable medium of any one of claim 19, 20, 21, or 22, wherein said magnetic resonance imaging data is obtained with a circuit configured to create or simulate spatial incoherence in a spectral domain.

24. The non-transitory machine-readable medium of claim 23, wherein said circuit is configured to apply a magnetic gradient to establish spatial incoherence in the spectral domain.

25. The non-transitory machine-readable medium of claim 23, wherein said circuit is configured to collect said magnetic resonance imaging data over sufficiently long readout times.

26. The non-transitory machine-readable medium of claim 22, wherein:
(a) said magnetic resonance imaging data is obtained by collecting multiple temporal k-space readouts, S(k,t);
(b) said magnetic resonance imaging data is obtained while a magnetic gradient is applied to said object as a technique for creating spatial incoherence in a spectral domain;
(c) said data from two different k-space locations in said readouts are temporally cross-correlated to produce a mutual coherence function, $\Gamma(k_1,k_2,\tau)$;
(d) said new correlation domain is generated by applying Van Cittert-Zernike and Wiener-Khinchin theorems such that a resulting mutual coherence function, $\Gamma(\Delta k, t)$, is mapped by the relative difference in the k-space locations, $\Delta \vec{k} = \vec{k}_1 - \vec{k}_2$; and
(e) an inverse Fourier transform is applied to said new correlation domain to obtain a square of the spectroscopic image, is $|s(r,f)|^2$.

27. The non-transitory machine-readable medium of claim 26, wherein a square root is taken of the square of the spectroscopic image, is $|s(r,f)|^2$, to produce an absolute value of the spectroscopic image, is $|s(r,f)|$.

28. A method for reconstructing an image of an object, the method comprising:
(a) taking magnetic resonance imaging data of the object;
(b) cross-correlating multiple k-space locations of said data to map a new correlation domain, the new correlation domain representative of a Fourier transform of a function defining a spectroscopic image, squared; and
(c) forming an image using said new correlation domain as a representation for transmission to an output module or display module or combination thereof, the forming including performing an inverse transform on the new correlation domain.

29. The method of claim 28, further comprising transmitting said formed image to an output module or display module or combination thereof.

30. The method of claim 28, wherein said multiple k-space locations comprise two k-space locations, $\vec{k}_1$ and $\vec{k}_2$.

31. The method of claim 30, wherein said new correlation domain, $\Delta\vec{k}$, is mapped by a relative difference in k-space locations where $\Delta\vec{k}=\vec{k}_1-\vec{k}_2$.

32. The method of any one of claim 28, 29, 30, or 31, wherein said magnetic resonance imaging data is obtained with a circuit configured to create or simulate incoherence in at least one of the following domains: relaxation, perfusion, diffusion, velocity, or temperature.

33. The method of claim 32, wherein said circuit is configured to apply a magnetic gradient or introducing a shim.

34. The method of claim 32, wherein said circuit is configured to collect said magnetic resonance imaging data over sufficiently long readout times.

35. The method of claim 32, wherein said circuit is configured to provide inhomogeneity within said domains.

36. A system for reconstructing an image of an object, the system comprising:
(a) an image data taking device configured for taking magnetic resonance imaging data of the object;
(b) a processor, in communication with the image data taking device, wherein said processor is configured for:
cross-correlating multiple k-space locations of said data to map a new correlation domain, the new correlation domain representative of a Fourier transform of a function defining a spectroscopic image, squared; and
forming an image using said new correlation domain, the forming including performing an inverse transform on the new correlation domain; and
(c) an output module or display module or combination thereof for receiving said formed image.

37. The system of claim 36, wherein said processor is configured for providing said formed image to be received by said output module or display module or combination thereof.

38. The system of claim 36, wherein said multiple k-space locations comprise two k-space locations, $\vec{k}_1$ and $\vec{k}_2$.

39. The system of claim 38, wherein said new correlation domain, $\Delta\vec{k}$, is mapped by a relative difference in k-space locations where $\Delta\vec{k}=\vec{k}_1-\vec{k}_2$.

40. The system of any one of claim 36, 37, 38, or 39, wherein said magnetic resonance imaging data is obtained with a circuit configured to create or simulate incoherence in at least one of the following domains: relaxation, perfusion, diffusion, velocity, or temperature.

41. The system of claim 40, wherein said circuit is configured to apply a magnetic gradient or introducing a shim.

42. The system of claim 40, wherein said circuit is configured to collect said magnetic resonance imaging data over sufficiently long readout times.

43. The system of claim 40, wherein said circuit is configured to provide inhomogeneity within said domains.

44. A non-transitory machine-readable medium having executable instructions stored thereon for performing a method for reconstructing a spectroscopic image of an object, the method comprising:
(a) acquiring magnetic resonance imaging data of the object;
(b) cross-correlating multiple k-space locations of said data to map a new correlation domain, the new correlation domain representative of a Fourier transform of a function defining a spectroscopic image, squared;
(c) forming image data using said new correlation domain, the forming including performing an inverse transform on the new correlation domain; and
(d) providing said formed spectroscopic image data to an output module or display module.

45. The non-transitory machine-readable medium of claim 44, wherein said executable instructions are configured for a computer processor.

46. The non-transitory machine-readable medium of claim 45, wherein said multiple k-space locations comprise two k-space locations, $\vec{k}_1$ and $\vec{k}_2$.

47. The non-transitory machine-readable medium of claim 46, wherein said new correlation domain, $\Delta\vec{k}$, is mapped by a relative difference in k-space locations where $\Delta\vec{k}=\vec{k}_1-\vec{k}_2$.

48. The non-transitory machine-readable medium of any one of claim 44, 45, 46, or 47, wherein said magnetic resonance imaging data is obtained using a circuit configured to create or simulate incoherence in at least one of the following domains: relaxation, perfusion, diffusion, velocity, or temperature.

49. The non-transitory machine-readable medium of claim 48, wherein said circuit is configured to apply a magnetic gradient or introducing a shim.

50. The non-transitory machine-readable medium of claim 48, wherein said circuit is configured to collect said magnetic resonance imaging data over sufficiently long readout times.

51. The non-transitory machine-readable medium of claim 48, wherein said circuit is configured to provide inhomogeneity within said domains.

* * * * *